United States Patent [19]

Farrow

[11] 4,381,560
[45] Apr. 26, 1983

[54] MULTIPLEX TRANSMITTER APPARATUS

[75] Inventor: Cecil W. Farrow, Highlands, N.J.

[73] Assignee: Bell Telephone Laboratories, Incorporated, Murray Hill, N.J.

[21] Appl. No.: 200,414

[22] Filed: Oct. 24, 1980

[51] Int. Cl.³ .............................................. H04J 3/02
[52] U.S. Cl. ..................................... 370/11; 370/112
[58] Field of Search ................. 370/11, 100, 105, 112; 375/42, 56

[56] References Cited

U.S. PATENT DOCUMENTS

| | | | |
|---|---|---|---|
| 3,128,342 | 4/1964 | Baker. | |
| 3,564,412 | 2/1971 | Whang et al.. | |
| 3,619,503 | 11/1971 | Ragsdale. | |
| 3,749,843 | 7/1973 | Roycraft et al. | 370/112 |
| 3,816,657 | 6/1974 | Fletcher et al. | 375/56 |
| 3,872,257 | 3/1975 | Bleickardt et al. | 370/112 |
| 3,943,285 | 3/1976 | Ragsdale et al.. | |
| 4,008,373 | 2/1977 | Nash et al. | 375/56 |
| 4,170,764 | 10/1979 | Salz et al.. | |

OTHER PUBLICATIONS

"Performance of Combined Amplitude and Phase-Modulated Communication Systems" IRE Transactions on Communications Systems, vol. CS-8, No. 4, pp. 232-237, Dec., 1960.

*Primary Examiner*—Gerald L. Brigance
*Attorney, Agent, or Firm*—Gregory C. Ranieri

[57] ABSTRACT

Combined amplitude and phase modulation of a multiplexed serial data stream is employed to generate a composite signal for transmission to a receiver. The composite signal includes a prescribed timing signal identifying a predetermined bit position in at least each $n^{th}$ symbol and group of n·M bits in the serial data stream. The timing signal forms the amplitude modulation component of the composite signal and is utilized by the receiver for properly resolving an n-fold ambiguity which arises when each symbol includes a nonintegral rational number of frames.

5 Claims, 2 Drawing Figures

MULTIPLEX TRANSMITTER APPARATUS

CROSS-REFERENCE TO RELATED APPLICATIONS

U.S. Patent Application entitled "Demultiplex Receiver Apparatus", Ser. No. 200,412, C. W. Farrow Case 17 is being filed in the U.S. Patent and Trademark Office concurrently herewith.

TECHNICAL FIELD

This invention relates to data transmission systems and, specifically, to a transmitter which generates a modulated multiplexed serial bit stream.

BACKGROUND OF THE INVENTION

In data transmission systems, modems and multiplex equipment partition a serial data stream into two different sequences of bit groups: namely, symbols having M bits and frames having N bits. Typically, an integral number (M/N) of frames are grouped together to form a symbol.

System synchronization at the transmitter is maintained by a symbol clock signal which identifies each symbol occurrence in the serial data stream. The symbol clock signal is incorporated into a transmitted signal by modulation of the serial data stream signal. Thus, system synchronization at a receiver is achieved simply by recovering the symbol clock signal from the modulated serial data stream.

The symbol clock signal is synchronized with each symbol occurrence. That is, each similar transition of the symbol clock signal occurs at an identical bit position within each successive symbol. Since a symbol includes an integral number of frames, the symbol clock signal is also synchronized with each group of frames. The symbol clock signal alone is employed to recover each symbol in the modem and each frame in the multiplex equipment. Hence, no ambiguity exists in using only the symbol clock signal to locate and define each frame because the symbol clock signal also coincides in phase once per symbol with an identical position of each successive integral number of frames comprising a symbol.

Known data transmission systems operate without ambiguity between the symbol clock and the frame only under the limited condition that each symbol includes an integral number of frames. A problem neither encompassed by the condition above nor addressed in the known systems occurs when a symbol includes a nonintegral number (M/N) of frames. In this situation, a so-called n-fold ambiguity arises with respect to the sequence of frames in the serial data stream because the beginning of a symbol and the beginning of a frame coincide once every n symbols or n·M bits, where n equals N/GCD(N,M) and GCD(N,M) is the greatest common divisor of the two integer variables N and M. Consequently, the symbol clock signal traverses N complete cycles every M frames. That is, the symbol clock signal which is transmitted by the modem in the modulated serial data stream coincides in phase with identical positions in successive frames only once every n symbols, i.e., the n-fold ambiguity, as opposed to once every symbol in the prior systems.

Consequently, location and identification of the frames and constituent data streams within consecutive frames is not possible in prior data transmission systems when a symbol includes a nonintegral number of frames because the signals transmitted by the modem in the modulation of the serial data stream are incapable of resolving the existing n-fold ambiguity between the symbol clock and the frame locations.

SUMMARY OF THE INVENTION

Amplitude modulation of an angle modulated serial data stream with a prescribed timing signal which identifies a predetermined bit position in at least each $n^{th}$ symbol and group of n·M bits is employed, in accordance with an aspect of the invention, to generate a transmitted composite signal to include a sufficient number of signals for properly resolving the n-fold ambiguity which arises when each symbol includes a nonintegral rational number (M/N) of frames. The integer variable n is equal to N/GCD(N,M) and GCD(N,M) is the greatest common divisor of the frame length (N) and the symbol length (M).

In one embodiment of the invention, the serial data stream is angle modulated by a differential phase shift keying (DPSK) modem. Amplitude modulation of the DPSK modulated serial data stream with the timing signal causes the envelope of a transmitted signal to be a low level replica of the timing signal. Phase control of the timing signal with respect to the symbol clock and each group of n consecutive symbols ensures that the timing signal identifies the predetermined bit position in each successive group of frames for subsequent recovery of the frames from the serial data stream at a receiver.

The timing signal has a pulse rate equal to a common divisor of the symbol clock rate and a frame clock rate. Typically, the common divisor is chosen to be the greatest common divisor.

BRIEF DESCRIPTION OF THE DRAWING

A more complete understanding of the invention may be obtained by reading the following description of a specific illustrative embodiment of the invention in conjunction with the appended drawing in which.

GENERAL DESCRIPTION (FIG. 1)

Figure 1:
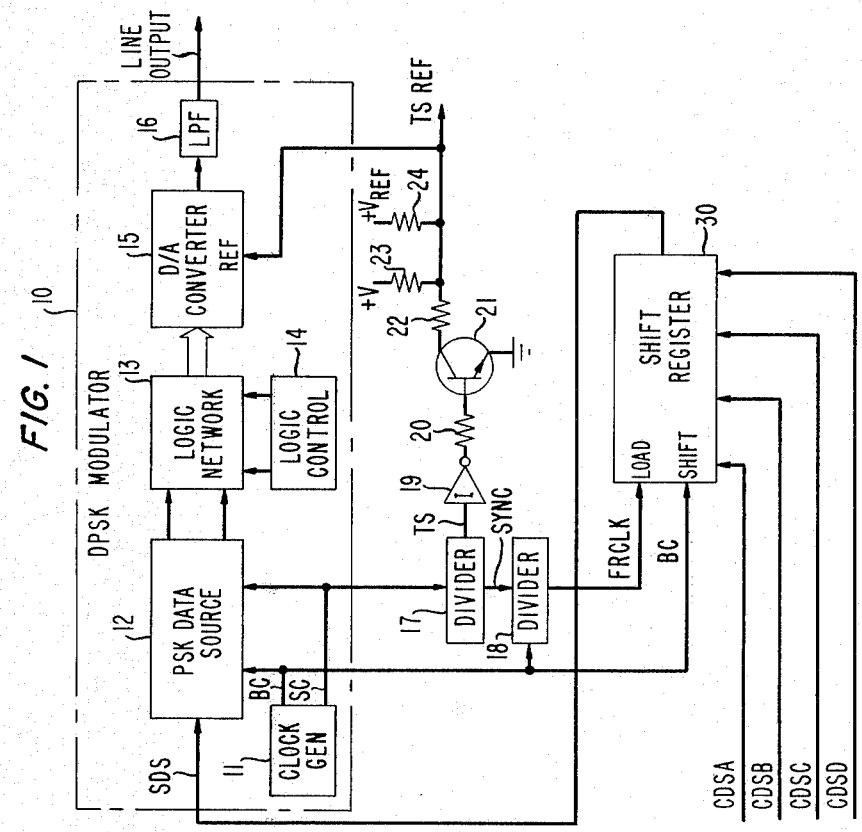
FIG. 1 is a simplified block diagram of a transmitter arrangement embodying an aspect of the invention.

The multiplex transmitter apparatus shown in FIG. 1 performs the functions of multiplexing and modulation under the control of two master clock signals, namely, bit clock signal BC and symbol clock signal SC. Shift register 30 multiplexes N constituent data streams into serial data stream signal SDS arranged in consecutive N-bit frames. DPSK modulator 10 responds to consecutive M-bit symbols in signal SDS to modulate that signal by differential phase shift keying (DPSK). Timing signal TS has a prescribed pulse rate and is employed by digital-to-analog converter 15 for amplitude modulating the DPSK modulated serial data stream signal. Signal LINE OUTPUT including an amplitude modulation component combined with a phase modulation component is then transmitted by the multiplex transmitter apparatus to a receiver, e.g., a demultiplex receiver apparatus of the type shown in my copending application, Ser. No. 200,412, C. W. Farrow Case 17. The amplitude modulation component of signal LINE OUTPUT is utilized by the receiver to ensure accurate recovery of each N-bit frame from the serial data stream which is arranged by phase modulation into M-bit symbols.

Figure 2:
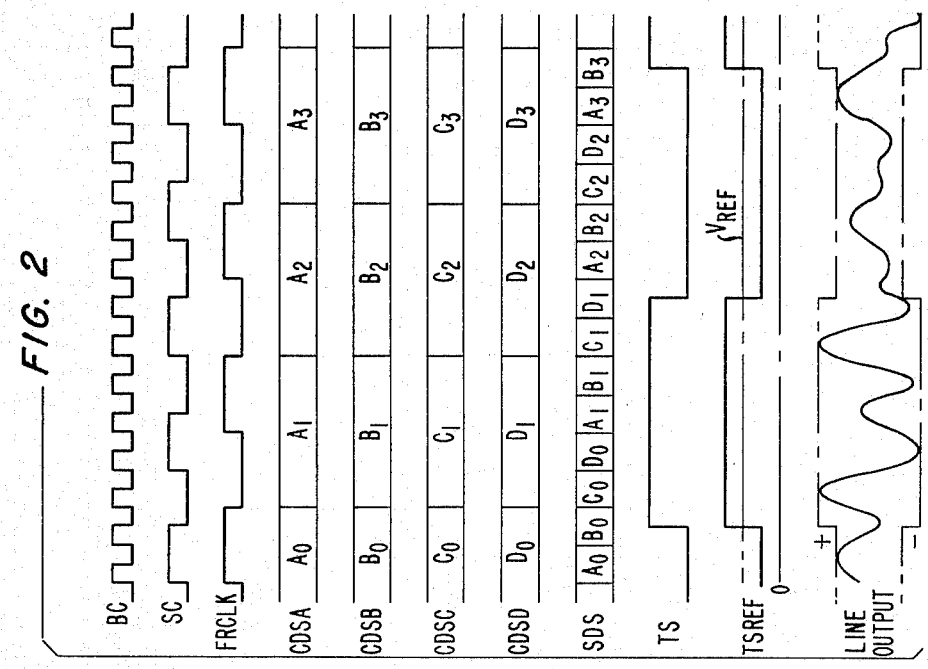
FIG. 2 is a timing diagram showing exemplary representations of signals denoted in FIG. 1.

Signal Description (FIG. 2)

FIG. 2 illustrates an exemplary set of input and output signals from the multiplex transmitter arrangement in FIG. 1.

Constituent data stream signals CDSA, CDSB, CDSC and CDSD are serial bit streams generated by digital apparatus at a remote location. Digital apparatus which generate these serial bit streams are digital terminals, computer peripheral equipment, digital monitoring devices and the like.

Bit positions in each constituent data stream signal are identified with the same letter, e.g., the letter A identifies each bit in signal CDSA. Each bit position in a particular signal is further identified by a numeric subscript attached to the letter. Consecutive bits in each constituent data stream are labelled with consecutive numeric subscripts, so that, in this example, bits $B_1$, $B_2$ and $B_3$ are consecutive bits in constituent data stream signal CDSB.

For N constituent data streams, a preferred bit rate for each constituent data stream is X/N bits per second (bps), where X is established by DPSK modulator 10. At this prescribed bit rate, the N constituent data streams are easily multiplexed frame by frame into one serial data stream (signal SDS) having a bit rate of X bps.

Serial data steam signal SDS is the multiplexed serial bit stream comprised of two different groups of bits: namely, frames having N bits and symbols having M bits. Both N and M are integers and M/N is a nonintegral rational number. In terms of serial data stream signal SDS, this means that each symbol in signal SDS includes a nonintegral rational number (M/N) of frames.

The symbol length, M bits, is determined by the DPSK modulation selected for use in DPSK modulator 10. Eight-phase DPSK modulation, as utilized in this example, requires that each symbol in signal SDS include three bits (M=3) to uniquely represent each phase of the eight-phase ($2^3=8$) DPSK modulation.

Each frame in serial data stream signal SDS includes one bit from each constituent data steam. For N constituent data streams, each frame of serial data stream signal SDS includes N bits, i.e., one bit from each of the N constituent data streams. In this example, there are four constituent data streams multiplexed into serial data stream signal SDS. Consequently, each frame has a length of four bits (N=4).

In the example from experimental practice depicted by the signals in FIG. 2, each symbol includes three bits (M=3) and each frame includes four bits (N=4). Assuming that bit $A_0$ of signal SDS is the first bit of both a symbol and a frame, the following sequences of symbols and frames result: the symbol sequence is $$A_0B_0C_0 - D_0A_1B_1 - C_1D_1A_2 - B_2C_2D_2 - A_3 \ldots,$$

and the corresponding frame sequence is $$A_0B_0C_0D_0 - A_1B_1C_1D_1 - A_2B_2C_2D_2 - A_3 \ldots.$$

Coincidence of the starting bit position of a symbol and the starting bit position of a frame occurs only once every four symbols (n=4) or twelve bits (n·M=12). A four-fold ambiguity (n=4) exists when using the symbol clock signal SC which is synchronized to a particular bit position in each symbol for locating a starting bit position for each frame. This ambiguity is discussed in more detail below with respect to signal SC.

Clearly, for the symbol sequence shown above, each symbol includes a nonintegral rational number (¾) of frames. Additionally, the frame rate, X/N frames per second, is equal to the product of a nonintegral rational number (¾) and the symbol rate, X/M symbols per second, where X bits per second (bps) is the bit rate of serial data stream signal SDS. It is noted that the bit rate is integrally divisible by the frame rate and by the symbol rate. A bit rate for each constituent data stream is X/N bps. In this example, the bit rate for signal SDS is 4800 bps (X=4800) causing the symbol rate to be 1600 symbols per second, the frame rate to be 1200 frames per second and the bit rate of each constituent data stream to be 1200 bps.

Bit clock signal BC has a pulse rate of X pulses per second (pps), i.e., one positive pulse transition at each bit occurrence in serial data stream signal SDS. Each positive transition of signal BC is synchronized with a starting position of each bit in signal SDS. In this example, the bit clock pulse rate is 4800 pps (X=4800).

Signal BC defines the location of each bit position in serial data stream signal SDS. Moreover, bit clock signal BC defines each bit position in every frame and symbol. However, bit clock signal BC contains insufficient information for distinguishing between any N consecutive bits to find the starting bit position of a frame.

Symbol clock signal SC has a pulse rate of X/M pps which, in this example, is 1600 pps. Each positive transition of signal SC is aligned with the beginning of a symbol, namely, bit positions $A_0$, $D_0$, $C_1$, and $B_2$ in serial data stream signal SDS. At the end of four consecutive symbols (n=4) or twelve bits (n·M=12), symbol clock signal SC repeats the pattern of positive transitions at bit locations $A_3$, $D_3$, $C_4$ and $B_5$ (not shown) over the next four consecutive symbols in the serial data stream. Only once every n·M bits or n symbols does symbol clock signal SC correctly indicate the starting bit position of one frame in a group of frames, i.e., bit positions $A_0$ and $A_3$ in serial data stream signal SDS. Thus, a rate of coincidence between positive transitions of symbol clock signal SC and the starting bit position of a group of frames in signal SDS is (X/n·M), which is 400 pps in this example.

Although, symbol clock signal SC correctly identifies the starting bit position ($A_0$) for one of three consecutive frames, the symbol clock signal incorrectly identifies three other possible starting bit positions ($D_0$, $C_1$ or $B_2$) within the same group of consecutive frames. Since signal SC cannot clearly distinguish which of the four bit positions ($A_0$, $D_0$, $C_1$ or $B_2$) at positive transitions of signal SC is the starting bit position of a frame, a four-fold ambiguity (n=4) results with respect to identifying and locating the beginning of a frame using symbol clock signal SC alone.

Timing signal TS has a pulse rate of (X/n·M) pps which is 400 pps in this example and is related to the pulse rates of the frame and symbol clock signals. The timing signal pulse rate is a common divisor and, specifically, the greatest common divisor of the frame and symbol clock pulse rates. When the timing signal pulse rate is equal to the greatest common divisor of the frame (FRCLK) and symbol (SC) clock signal pulse rates, timing signal TS spans n·M/GCD(N,M) bits per cycle of signal TS. At this pulse rate for signal TS, synchronization of frame clock signal FRCLK at the receiver occurs in less time than for a timing signal pulse rate at a different common divisor of the frame and symbol clock rates which spans any integral multiple of $n \cdot M/GCD(N,M)$ bit per cycle of signal TS. The phase of signal TS with respect to each frame is determined only by symbol clock signal SC and is independent from the data bits in serial data stream signal SDS. It is the judicious combination of timing signal TS together with the other clock signals transmitted in the angle modulation that allows a receiver to resolve the n-fold ambiguity (n=4) between symbol clock SC and the starting bit position for frames in serial data stream SDS.

Frame clock signal FRCLK is controlled in phase to have positive transitions synchronized with the starting bit position of each frame in signal SDS, in this example, bit positions $A_0$, $A_1$, $A_2$. The positive transitions of signal FRCLK also coincide with the middle of each bit position in each constituent data stream signal. Frame clock signal FRCLK has a pulse rate equal to X/N pps which is 1200 pps in this example.

Reference timing signal TSREF is a level shifted and attenuated replica of timing signal TS. Signal TSREF has a dc amplitude component equal to $+V_{REF}$ volts shown in FIG. 2. Attenuation of signal TS and a subsequent shift of its dc level causes signal TSREF to oscillate only slightly about $+V_{REF}$ so that not more than a 5 percent modulation index is present in signal LINE OUTPUT which is transmitted by the multiplex transmitter arrangement.

Transmitted signal LINE OUTPUT comprises two components, namely, an amplitude modulation (AM) component causing signal LINE OUTPUT to have less than a 5 percent modulation index and an angle modulation component obtained by differential phase shift keying (DPSK) modulation. A relatively low modulation index has been selected for signal LINE OUTPUT in order to avoid distorting the angle modulation component of signal LINE OUTPUT and appreciably affecting error performance (i.e., signal-to-noise ratio) at the receiver.

The DPSK modulation component of signal LINE OUTPUT depends upon the data bits in data signal SDS and corresponding clock signals. On the other hand, the AM modulation component is a replica of timing signal TS and is a function of the frame (FRCLK) and symbol (SC) clock signals, totally independent from the data bits in signal SDS. Signals SDS, BC and SC are recovered by DPSK demodulation of signal LINE OUTPUT; signal TS is recovered by AM demodulation of signal LINE OUTPUT.

Detailed Description

The multiplex transmitter arrangement shown in FIG. 1 comprises DPSK modulator 10, parallel to serial shift register 30, a level shifting circuit and other associated circuits. Modulation and multiplexing are the major functions performed by the multiplex transmitter arrangement.

Modulator 10 is a DPSK modem of the type well known in the art and disclosed in U.S. Pat. No. 3,128,342 issued to P. A. Baker on Apr. 7, 1964 and U.S. Pat. No. 3,749,843 issued to T. J. Roycraft et al. on July 31, 1973. The Baker and Roycraft et al. patents are incorporated in this application by reference.

Modulator 10 generates an eight-phase DPSK signal, signal LINE OUTPUT, in joint response to supplied serial data stream signal SDS and several internally generated clock signals.

DPSK modulator 10 includes clock generator 11, PSK data source 12, logic network 13, logic control 14, digital-to-analog (D/A) converter 15 and low pass filter 16. The basic operation of the above-listed elements in DPSK modulator 10 has been completely disclosed in the Baker and Roycraft et al. patents previously cited and incorporated by reference. For example, PSK data source 12 is shown in FIG. 1 of the Roycraft et al. patent as element 10. Similarly, PSK data source 12 is disclosed in FIG. 1 of the Baker patent as elements 11 and 12. Also, clock generator 11 is equivalent to elements 14 and 15 together with elements 16, 23 and 24 as shown in the Baker patent. Low pass filter 19 in FIG. 1 of the Roycraft patent and logic network 21, logic control 26 and D/A converter 24 all in FIG. 2 of the Roycraft patent correspond to identically named elements here in FIG. 1, that is, low pass filter 16, logic network 13, logic control 14 and D/A converter 15, respectively. Operational descriptions of the elements in DPSK modulator 10 are disclosed in the accompanying specifications of the Roycraft et al. and Baker patents. Further description of the elements in DPSK modulator 10 is limited to clock generator 11 and D/A converter 15.

Clock generator 11 generates two synchronized clock reference signals, namely, bit clock signal BC and symbol clock signal SC. In this example, signal BC has a pulse rate of 4800 pps and signal SC has a pulse rate of 4800/3 pps or 1600 pps.

Symbol clock signal SC is supplied to rate divider 17. Divider 17 is a divide-by-four circuit. The divisor, four, is equal to the degree of ambiguity present between signal SC and the frames in serial data stream signal SDS. Divider 17 responds to symbol clock signal SC to generate timing signal TS at a pulse rate of 400 pps, which is one-quarter (1/n, where n=4) of the signal SC pulse rate.

Timing signal TS extends in one cycle over four symbols and three frames. The positive transitions of signal TS are aligned with a particular bit position in each third frame. In the example shown in FIG. 2, positive transitions of signal TS occur at bit position B in each third frame and, specifically, at bit positions $B_0$ and $B_3$ in serial data stream signal SDS.

Synchronizing signal SYNC (FIG. 1) is a pulse signal also generated by rate divider 17. Signal SYNC is supplied to rate divider 18 as a periodic initialization pulse to ensure that frame clock signal FRCLK generated by divider 18 has a predetermined phase relationship with symbol clock signal SC and timing signal TS. The phase relationship of these signals is important to proper receiver operation as described in my copending application, Ser. No. 200,412 (C. W. Farrow Case 17). An exemplary phase relationship is shown in FIG. 2. Signal SYNC, in this example, is generated in accordance with the following logical equation:

$$SYNC = TS + TS\angle -90° + SC,$$

where + is a logical OR function and $TS\angle -90°$ is an exact replica of timing signal TS delayed by 90 degrees.

Rate divider 18 generates frame clock signal FRCLK at a pulse rate of 1200 pps in response to bit clock signal BC and synchronizing signal SYNC. The divisor employed in divider 18 is equal to n, which is the frame length divided by the greatest common divisor of the frame length and the symbol length. Since n is equal to four in this example, divider 18 is a divide-by-four circuit. Therefore, the pulse rate of frame clock signal FRCLK is 4800/4 pps or, more simply, 1200 pps.

Synchronizing signal SYNC inhibits divider 18 to generate one frame clock signal FRCLK having a particular phase relationship with symbol clock signal SC and timing signal TS as shown in FIG. 2.

Frame clock signal FRCLK and bit clock signal BC are supplied to shift register 30 at the LOAD and SHIFT input terminals, respectively. Constituent data stream signals CDSA, CDSB, CDSC and CDSD are supplied to parallel input data terminals of shift register 30. There are N stages (N=4) in shift register 30.

At each positive transition of signal FRCLK, one bit from each of the constituent data stream signals is sampled. The resulting sampled bits form a frame and are stored in consecutive stages of register 30. Subsequently, each positive transition of signal BC causes the stored bits of a frame to be shifted serially out of register 30 thereby generating serial data stream SDS. In effect, shift register 30 operates as a parallel input, serial output device under control of signals BC and FRCLK.

Serial data stream signal SDS, a 4800 bps data signal in this example, is supplied to DPSK modulator 10 for conversion into an eight-level DPSK modulated data signal in accordance with well known modulation techniques referenced above.

The level shifting circuit includes inverter 19, resistors 20, 22, 23 and 24 and transistor 21. Functionally, the level shifting circuit attenuates timing signal TS and shifts the attenuated timing signal to a different d.c. level in preparation for direct amplitude modulation of the DPSK modulated data stream via D/A converter 15.

Inverter 19 shifts the phase of timing signal TS by 180 degrees to generate inverted timing signal $\overline{TS}$ (not shown). Resistor 20 is a current limiting resistor for reducing the current applied to npn transistor 21.

Transistors 21 operates as an on-off switch in response to the current limited amplitude level of signal $\overline{TS}$. When signal $\overline{TS}$ is a logical '1' level (signal TS is a logical '0' level), transistor 21 conducts current causing the junction between the transistor 21 collector terminal and resistor 22 to be approximately 0.3 volts. On the other hand, when signal $\overline{TS}$ is a logical '0' level (signal TS is a logical '1' level), transistor 21 is cut off (nonconducting) causing resistor 22 to appear to be connected to a virtual open circuit (high impedance) at the transistor 21 collector terminal.

Resistors 22, 23 and 24 form a voltage divider circuit. Each of the resistors is connected to a common node at which reference timing signal TSREF is generated. Resistor 22 is also connected to the collector junction of transistor 21; resistor 23 is connected to a d.c. voltage source at $+V$ volts; and resistor 24 is connected to a d.c. voltage source at $+V_{REF}$ volts. In order that signal TSREF oscillate slightly about the d.c. voltage level at $+V_{REF}$ volts, resistor 23 has a much higher resistance than resistor 24. The amount of oscillation above and below $+V_{REF}$ volts establishes the percent modulation index for the amplitude modulation on the DPSK modulated data stream. In this example, resistances of 2.7 kohm, 8.2 kohm and 1.0 kohm were chosen for resistors 22, 23 and 24, respectively, to ensure that, for the particular voltages $+V$ and $+V_{REF}$, the modulation index is not greater than 5 percent.

When transistor 21 is conducting, the amplitude of signal TSREF is slightly lower than $+V_{REF}$ volts. Conversely, when transistor 21 is nonconducting, the amplitude of signal TSREF is slightly higher than $+V_{REF}$ volts. Symmetry of the oscillations of signal TSREF about $+V_{REF}$ volts is of secondary importance. Of primary importance is the actual amplitude of signal TSREF which determines the percent modulation index.

Reference timing signal TSREF is supplied to a reference (REF) input on D/A converter 15. In this embodiment, D/A converter 15 operates as any multiplying D/A converter well known in the art. That is, D/A converter causes the digital output signal from logic network 13 to be multiplied by the amplitude of signal TSREF. The product from this multiplication is an analog signal generated by D/A converter 15 whose envelope varies as the amplitude of signal TSREF. In effect, signal TSREF directly amplitude modulates the envelope of the DPSK modulated data stream; the oscillations of signal TSREF cause similar oscillations of the envelope of the DPSK modulated data stream.

Low pass filter 16 smooths the output signal from D/A converter 15 to produce signal LINE OUTPUT for transmission to a receiver. Signal LINE OUTPUT includes the symbol clock and bit clock information as well as the serial data stream in the DPSK modulation component. Moreover, signal LINE OUTPUT includes a replica of timing signal TS, signal TSREF, as the envelope of the DPSK modulated data stream which is denoted in FIG. 2 by dashed lines. Inclusion of timing signal TS in the transmitted signal ensures that the transmitted signal LINE OUTPUT conveys sufficient information to a receiver to permit accurate recovery of frames from the serial data stream when a symbol includes a nonintegral rational number of frames.

Although DPSK modulation has been employed throughout the example from experimental practice disclosed herein, it is submitted that frequency modulation and other forms of angle modulation are equally applicable for producing similar results.

I claim:

1. Apparatus for generating a composite waveform having a first component signal corresponding to a supplied serial bit stream and a second component signal corresponding to a timing signal, the supplied serial bit stream capable of being partitioned into either consecutive symbols or consecutive frames, the apparatus comprising angle modulation means responsive to consecutive symbols of the supplied serial bit stream for generating the first component signal of the composite waveform, the apparatus characterized by, means for generating the timing signal at a predetermined pulse rate corresponding to a rate of occurrence for consecutive groups of (N·M)/GCD(N,M) bits of the supplied serial bit stream, where M is the number of bits in each symbol, N is the number of bits in each frame, GCD(N,M) is the greatest common divisor of N and M and M/N is a nonintegral rational number, and means responsive to the timing signal for amplitude modulating the first component signal therewith to generate the second component signal of the composite waveform.

2. The apparatus as defined in claim 1 wherein the predetermined pulse rate of the timing signal is equal to the rate of occurrence for consecutive groups of an integral multiple of (N·M)/GCD(N,M) bits of the supplied serial bit stream.

3. The apparatus as defined in claim 2 wherein the means for generating the timing signal includes, means for generating at least one clock signal having a predetermined pulse rate substantially equal to the rate of occurrence for each symbol in the supplied serial bit stream, rate divider means responsive to the at least one clock signal for reducing the pulse rate of the at least one clock signal to the predetermined pulse rate to generate the timing signal.

4. The apparatus as defined in claim 3 wherein the means for amplitude modulating includes, means for attenuating the amplitude level of the timing signal, means for shifting an output signal from the attenuating means by a prescribed amount to a particular direct current amplitude level, and means for combining the first component signal with an output signal from the shifting means to generate the composite waveform.

5. The apparatus defined in claim 4 wherein the combining means is a multiplying digital-to-analog converter.

* * * * *